United States Patent [19] [11] 3,728,482
Wren [45] Apr. 17, 1973

[54] FOCUSING

[75] Inventor: James Frank Wren, Wrestlingworth, England

[73] Assignee: Image Analysing Computers Limited, Melbourn, Royston, Hertfordshire, England

[22] Filed: Nov. 5, 1970

[21] Appl. No.: 87,107

[30] Foreign Application Priority Data

Nov. 5, 1969 Great Britain....................54,114/69

[52] U.S. Cl. ..............178/7.2, 178/DIG. 29, 95/44 R
[51] Int. Cl. ............................H04n 5/26, G03b 3/10
[58] Field of Search.......................178/6.8, 7.1, 7.92, 178/7.2, DIG. 29; 95/44 R; 250/204; 353/101; 315/31 R, 31 TU

[56] References Cited

UNITED STATES PATENTS 2,999,436 9/1961 Faulhaber.....................178/DIG. 29
2,134,757 11/1938 Goldsmith.....................178/DIG. 29

*Primary Examiner*—Robert L. Griffin
*Assistant Examiner*—George G. Stellar
*Attorney*—Beveridge & De Grandi

[57] ABSTRACT

The invention provides a system for modifying the electrical signal corresponding to the high frequency content of a video signal in accordance with variations in other parameters of the video signal, so as to render the modified signal substantially independent of such variations. Such modification is referred to as normalising the high frequency signal. One system is described for normalising with respect to the number of feature boundaries, another the density changes across the boundaries and another the obliquity of the boundaries to the scanning direction. A further modification allows improvement to the signal to noise ratio of the modified signal.

21 Claims, 11 Drawing Figures

Figures 1, 1A:
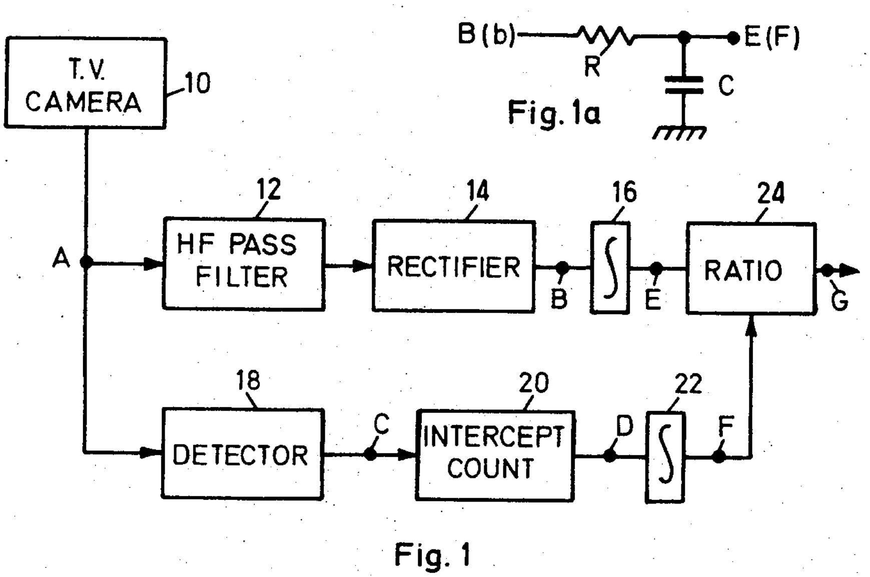

INVENTOR:
JAMES FRANK WREN
by
Beveridge & De Grandi
Attorneys

INVENTOR
JAMES FRANK WREN
by
Beveridge + De Grandi
Attorneys

INVENTOR:
JAMES FRANK WREN
by
Beveridge + De Grandi
Attorneys

INVENTOR
JAMES FRANK WREN
by
Beveridge + De Grandi
Attorneys

INVENTOR
JAMES FRANK WREN
by
Beveridge + DeGrandi
Attorneys

INVENTOR
JAMES FRANK WREN
by
Beveridge + De Grandi
Attorneys

INVENTOR
JAMES FRANK WREN
by
Beveridge + De Grandi
Attorneys

INVENTOR
JAMES FRANK WREN
by
Beveridge + DeGrandi
Attorneys

FOCUSING

This invention concerns automatic focusing for image analysis systems employing a source of scanned electrical video signal which employs rectilinear scanning with or without interlace.

In a 5 megacycle bandwidth electrical video signal, feature boundaries and fine detail will be represented predominantly by frequencies exceeding 1 megacycle. Signal frequencies below this level will in general relate to larger elements in the image. It is thus possible to isolate the high frequency content of this signal and use the isolated signal to control a system for automatically setting some or all of the focusing parameters, since the high frequency content of the video signal will vary rapidly towards or away from a maximum near a point of optimum focus. Such a control system may be arranged to act on some or all parameters controlling the focus but, in a typical arrangement, parameters such as the bandwidth of amplifying circuits, the internal electron focusing within the source and the display tube are fixed, or preset and only the optical focusing system for focusing the original image on the photo sensitive layer of the source is made adjustable for control by the control system.

It is a first object of the present invention to reduce the variation in signal supplied to an automatic focusing system due to variations in the image content.

It is a second object of the present invention to reduce such variation due to variations in the boundary and small feature content of the image.

It is a third object of the present invention to reduce such variation due to differences in the relative densities of features and backgrounds.

It is a fourth object of the present invention to reduce such variation due to variations in the obiquity of features and feature boundaries relative to the direction of movement of the scanning spot.

It is a fifth object of the present invention to reduce the noise content of the signal supplied to an automatic focusing system.

According to the broadest aspect of the present invention a system for producing an electrical signal indicative of the focus of an image comprises means responsive to a scanned electrical video signal of the image to generate a first electrical signal whose value indicates the high frequency content of the video signal, means also responsive to said video signal to generate a second electrical signal whose value indicates the value of a variable parameter associated with the feature content of the image (other than the focus thereof) which affects the high frequency content of the video signal and means operable in response to changes in the value of the second electrical signal to modify the value of the first electrical signal and reduce the variation thereof due to the said variable parameter.

Such a system can thus be said to normalise the signal whose amplitude corresponds to the high frequency content of the video signal, with respect to this particular parameter, since its magnitude will be substantially independent of variations due to this parameter.

Normalisation may be effected with respect to the number of line scan intersections with feature boundaries, the grey level difference at the different boundaries and the obliquity of the boundaries to the direction of line scan.

In one embodiment, each intersection of the scanning spot with a feature boundary is counted and a summation signal produced for a complete frame scanning. The high frequency content of the video signal is summed over the same frame scan and is amplified by a variable gain amplifier whose gain is decreased with increasing signal corresponding to the number of intersections.

Conveniently the summation required for the first and second signals is effected by integration on a time basis. Where rectilinear scanning is employed the time interval is conveniently equal to one or a whole number multiple of frame scan periods.

By feature boundary it is intended to mean any change in grey level in the image.

In a second embodiment of the invention, the grey level difference at each feature boundary is determined and the gain of a variable gain amplifier to which the high frequency content of the video signal is supplied, is varied inversely relative to the magnitude of the grey level difference.

In a third embodiment of the invention, the obliquity of a feature boundary i.e., its angle relative to the direction of movement of the scanning spot is determined, and the gain of a variable gain amplifier to which the high frequency content of the video signal is supplied, is varied in accordance with the degree of obliquity.

It will be appreciated that with finite spot size, the rise time of an electrical video signal corresponding to a feature boundary will increase with increasing obliquity of the feature i.e., decreasing angle between the boundary and the intersecting scan line. Hence, with oblique features, the level of high frequency content will be less for a given focus setting than for features whose boundaries are intersected perpendicularly by the scanning spot. To this end the gain of the variable gain amplifier is increased when an oblique boundary is detected to an extent determined by the obliquity of the boundary.

The noise content of a signal indicative of the sharpness of focus of features in an image may be reduced by blocking the signal except in the region of a detected feature boundary.

Any or all of the signal normalisation systems may be combined to provide a more complete correction system and any combination of normalisation systems may be combined with noise reduction means as previously described. Typically the video signal is first gated to reduce the noise content and then normalised. Conveniently some of the stages required for noise reduction may be employed for normalisation, to reduce duplication.

Figure 2:
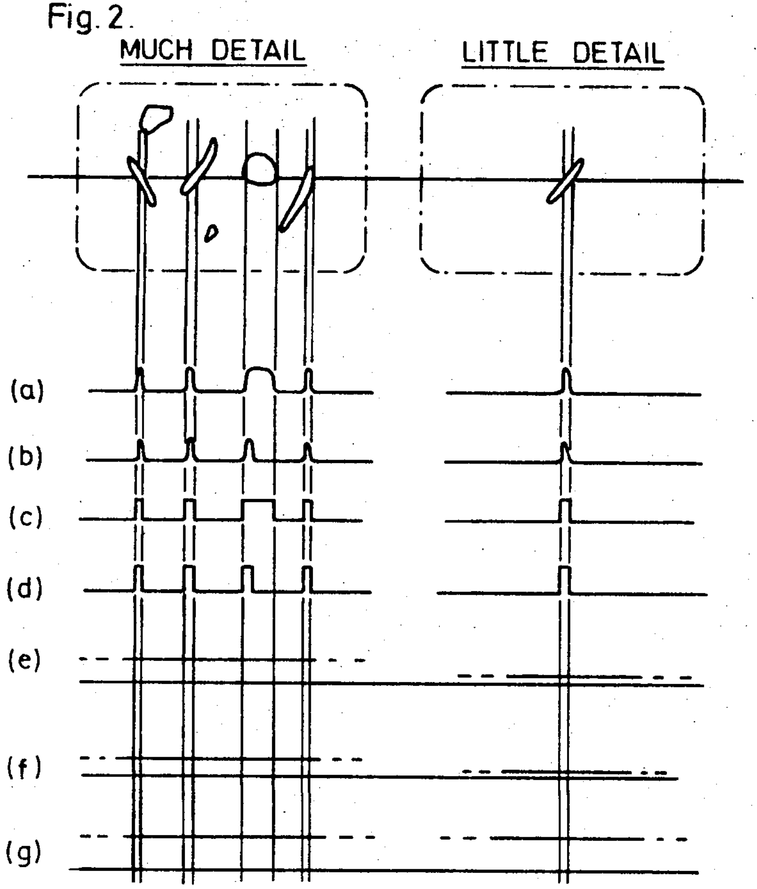
Figure 3:
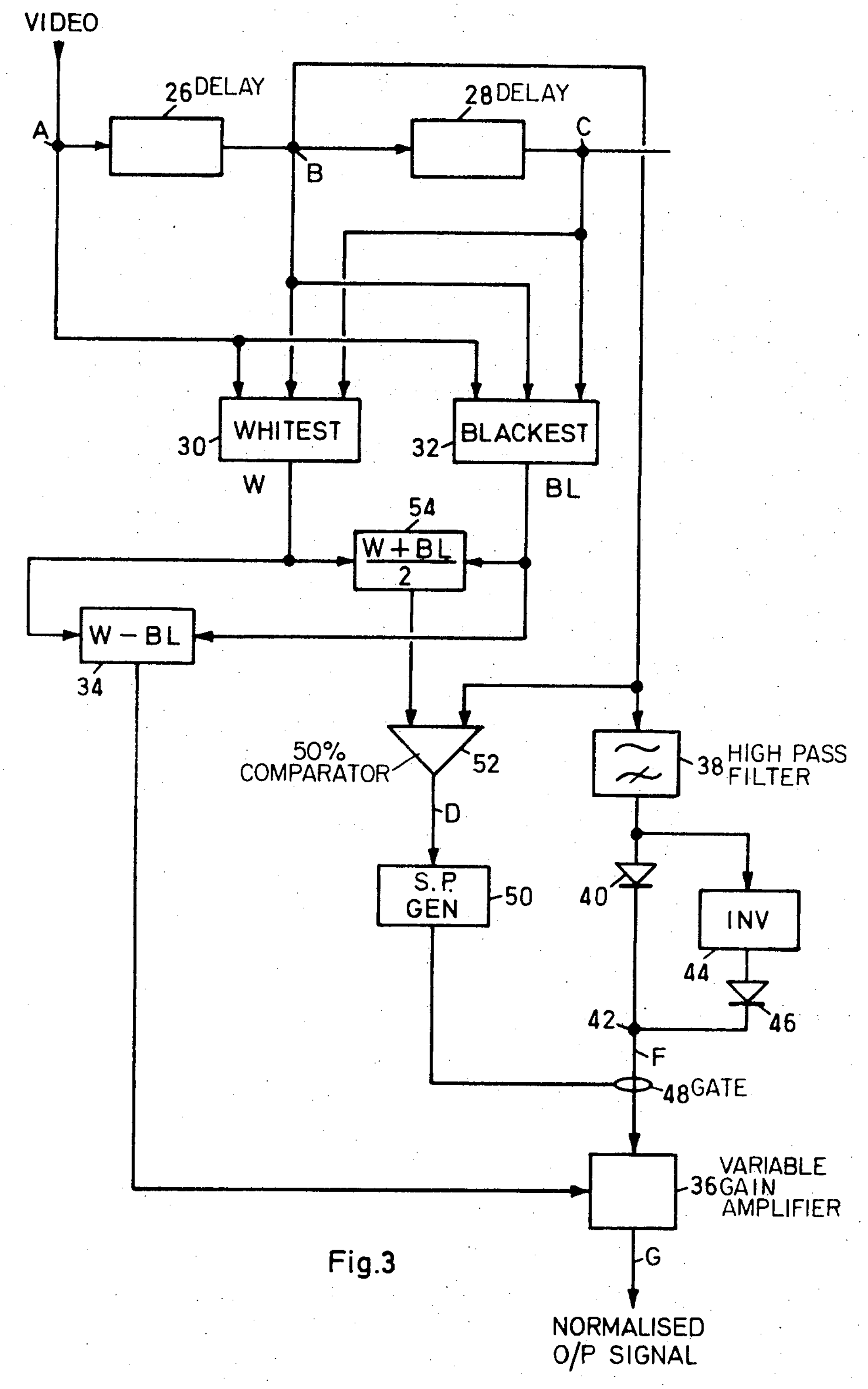
Figure 4:
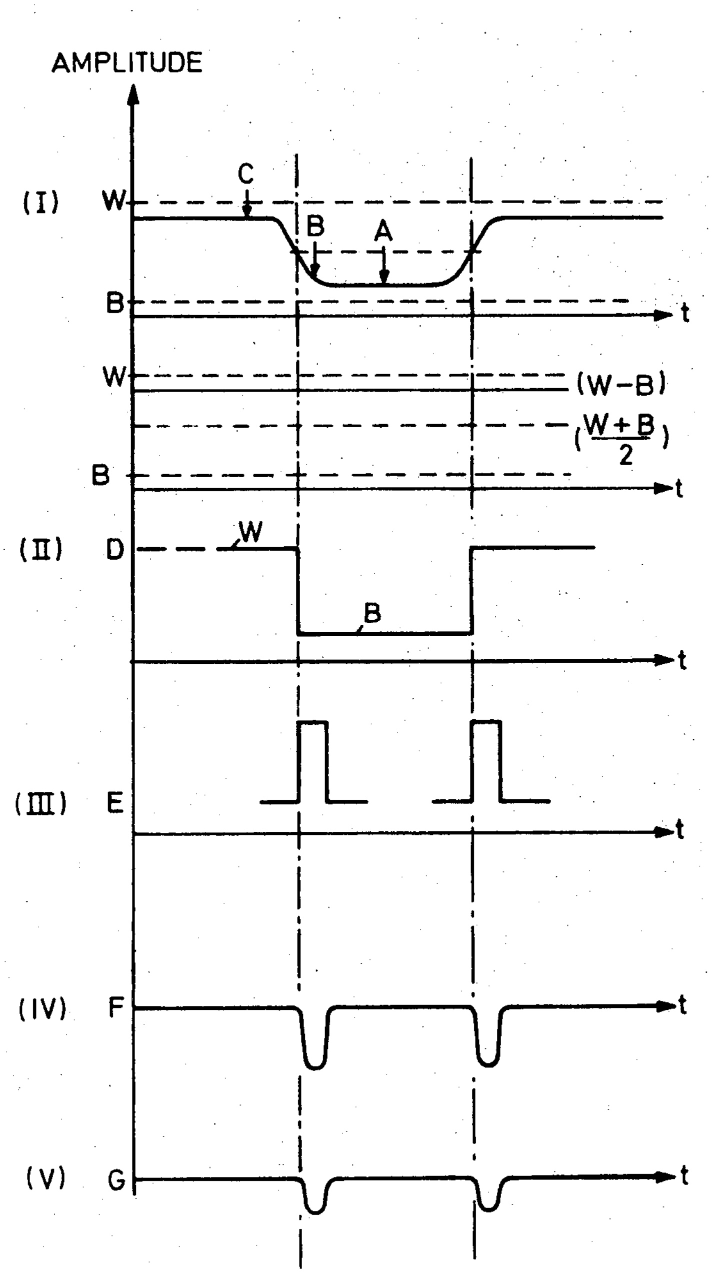
Figure 5:
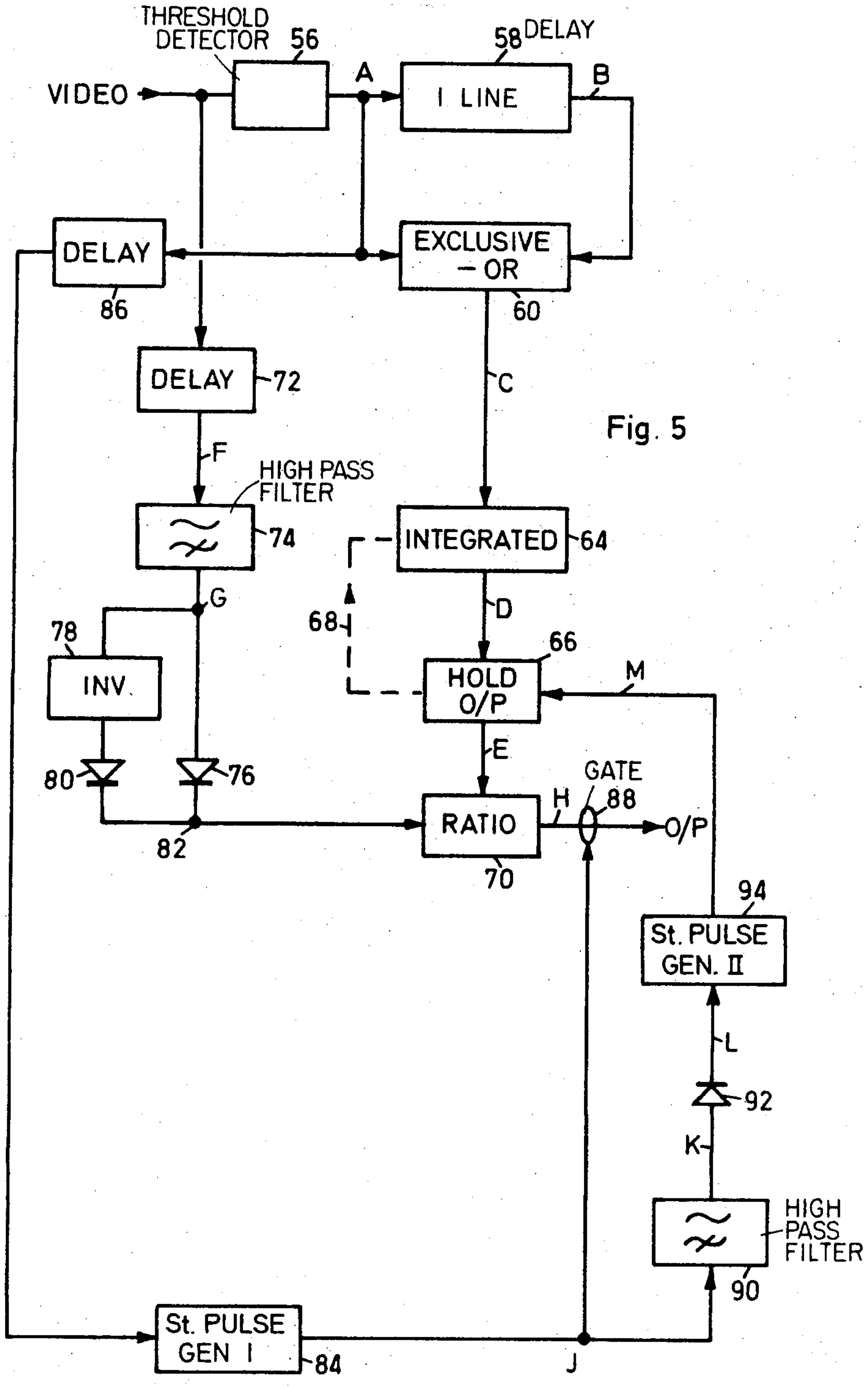
Figure 6:
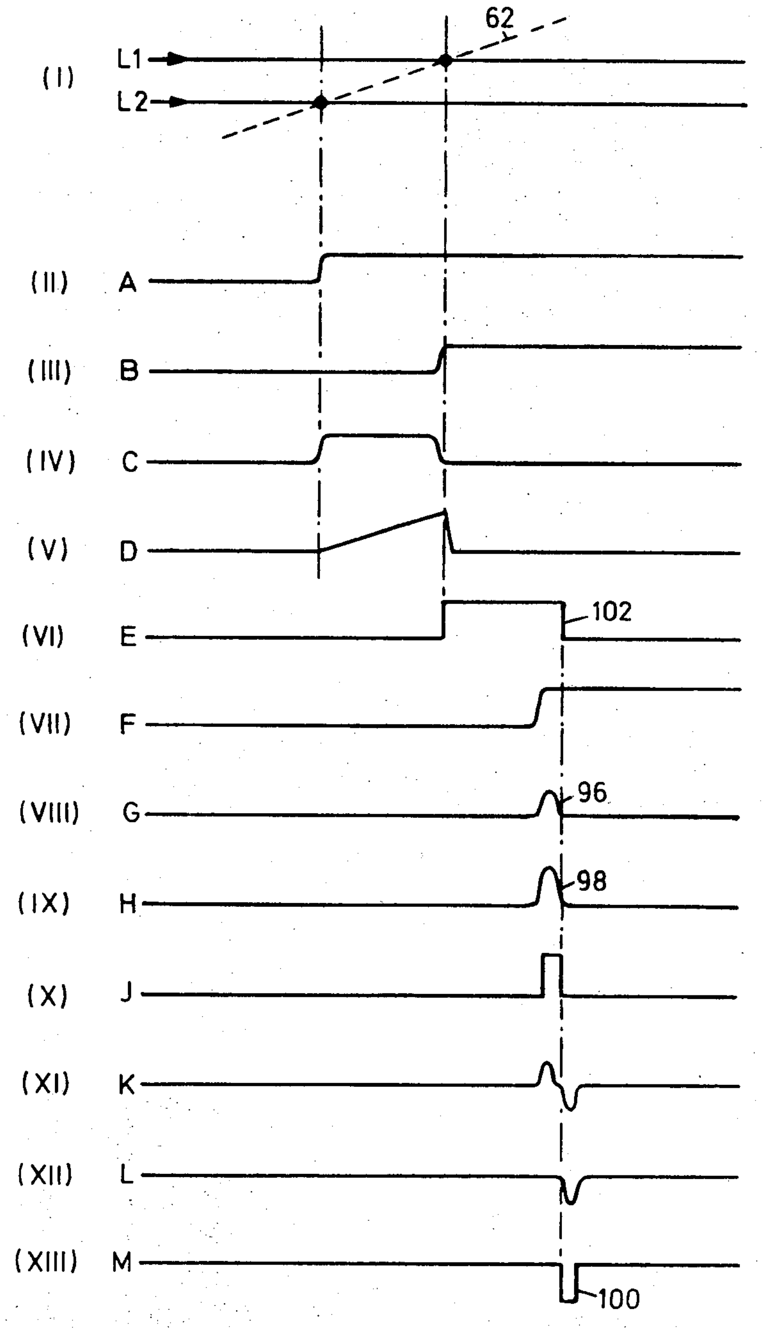
Figure 7:
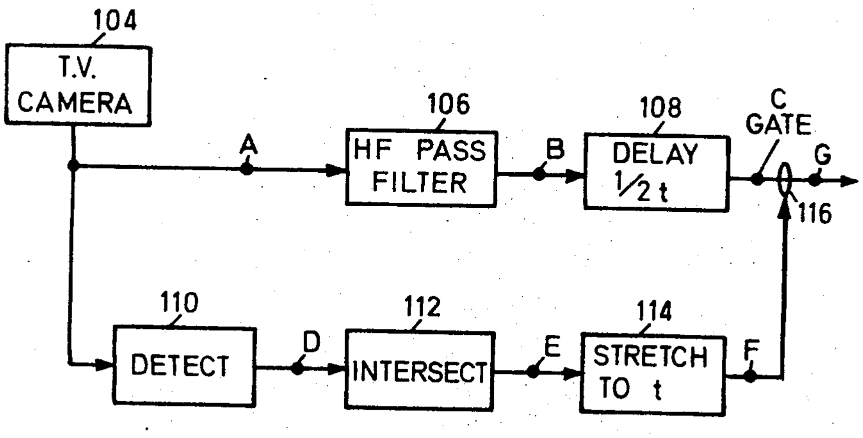
Figure 8:
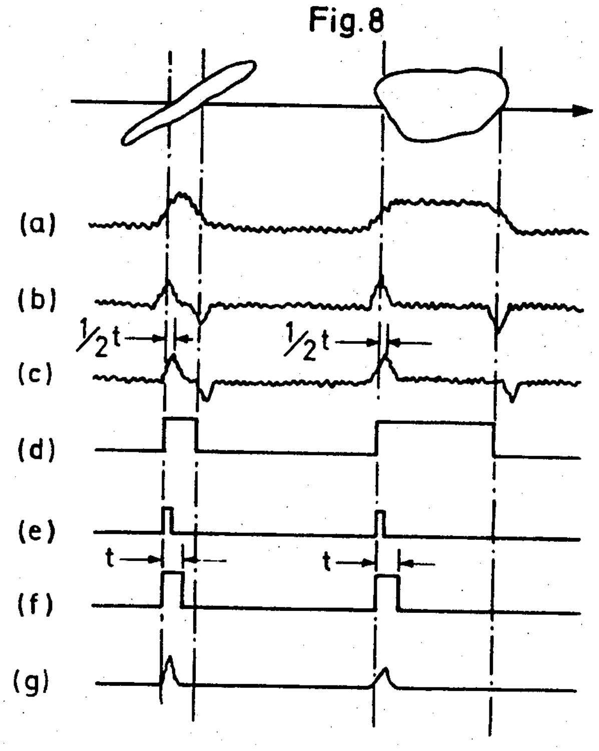
Figure 9:
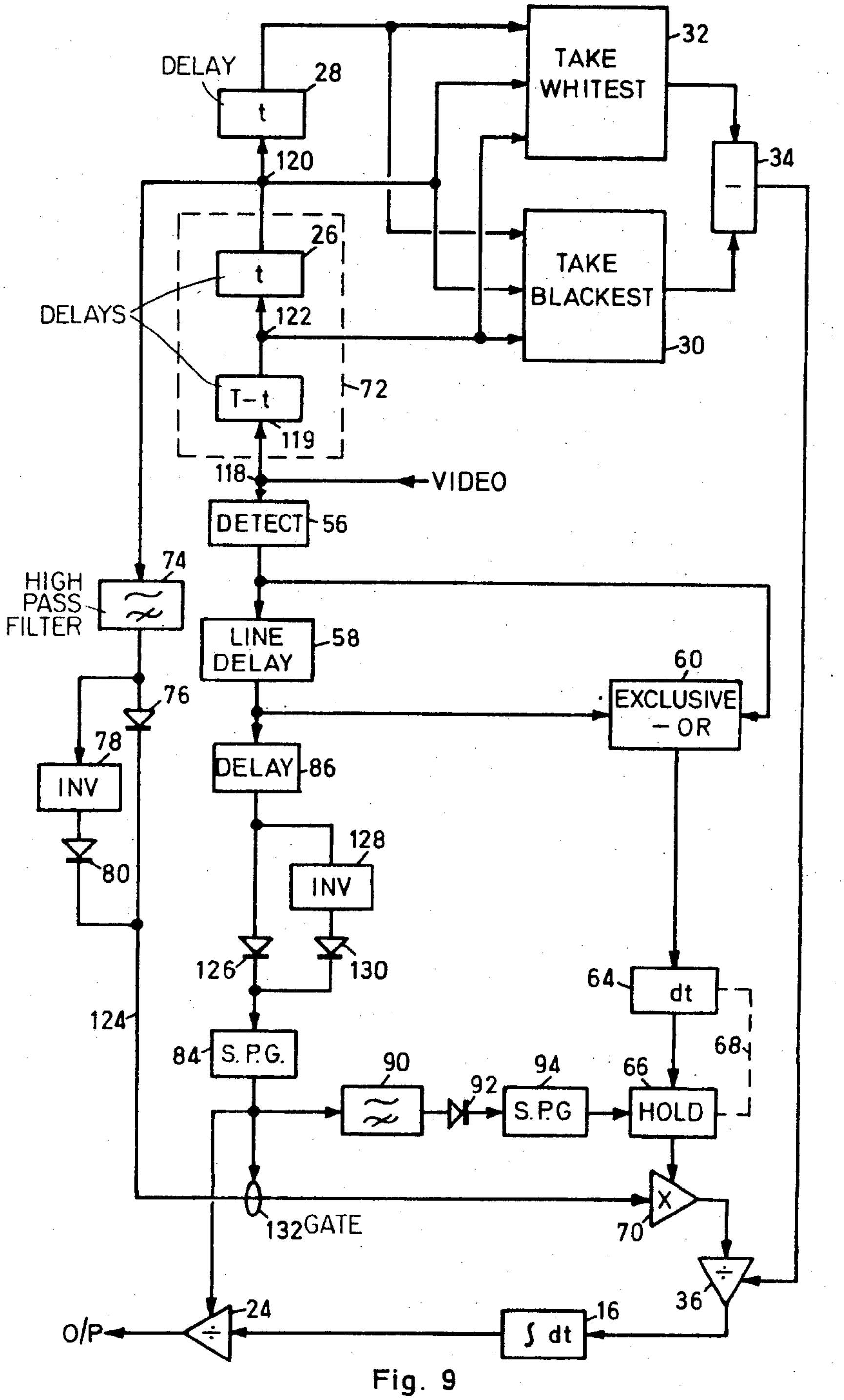
Figure 10:
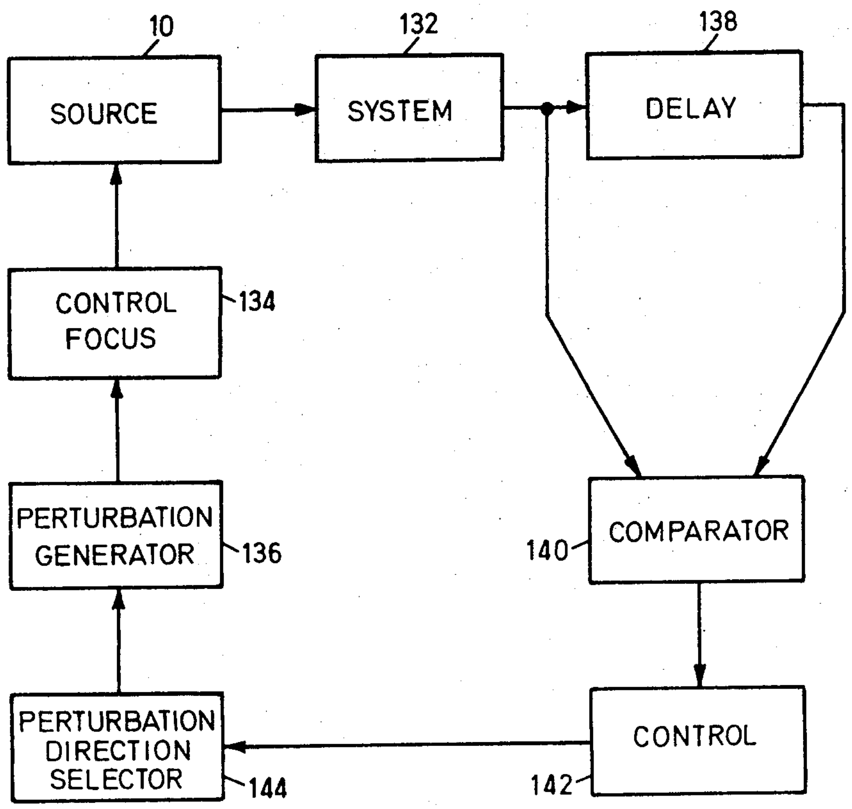

The invention will now be described by way of example with reference to the accompanying drawings in which:

FIG. 1 illustrates a system for obtaining a signal indicative of the focus of an image normalised with respect to the number of scan intersections with feature boundaries, FIG. 1*a* illustrates an integrator useful in FIG. 1, FIG. 2 illustrates graphically wave forms obtainable at various points in FIG. 1, FIG. 3 is a block circuit diagram of a system for producing a signal indicative of the focus of an image which is normalised with respect to the density variations in the image, FIG. 4 illustrates graphically wave forms obtainable at various points in FIG. 3, FIG. 5 is a block circuit diagram of a system for producing a signal indicative of the focus of an image which is normalised with respect to the obliquity of the feature boundaries intersected by scan lines, FIG. 6 illustrates graphically wave forms obtainable at various points in the circuit of FIG. 5, FIG. 7 is a block circuit diagram of a device for improving the signal to noise ratio of a signal indicative of the focus of an image, FIG. 8 illustrates graphically wave forms obtainable at various points in the circuit of FIG. 7, FIG. 9 is a simplified block circuit diagram of a system employing noise reduction and normalisation for intersections, density and obliquity, and FIG. 10 is a simplified block circuit diagram of a complete automatic focus system.

FIG. 1 illustrates a system for normalising a video signal from a camera 10, which comprises a first signal path containing a high frequency pass filter 12 allowing only high frequency signal content corresponding to fine detail and feature edges to pass to a rectifier 14 having typically a square low characteristic and integrating stage 16; and a second parallel signal path containing a threshold detector or discriminator 18, an intercept counting stage 20 arranged to provide a single pulse of equal width and height for each intersection of a scan line with a feature and an integrating stage 22. The two signal paths have a common input supplied from the camera 10 and the outputs from the two integrating stages 16, 22 are applied to a variable gain amplifier 24 arranged to provide an output signal at G whose magnitude corresponds to the quotient of the output from the integrating stage 16 and integrating stage 22.

FIG. 2 illustrates two television displays of images having in the first case a lot of detail and in the second case only a single small feature. FIGS. 2(*a*) to 2(*g*) indicate typical waveforms at points A-G in the circuit diagram of FIG. 1 arising from a single, typical line scan, shown in the representation of the television displays. Thus, FIG. 2(*a*) indicates the waveform at point A at which the video output from the camera 10 appears. After filtering and rectification, only the narrow uni-directional pulses of FIG. 2(*b*) appear at point B. After integration in stage 16 over a time interval of say one complete frame, we have a signal whose amplitude corresponds to the number of intersections. This may then be used during the next and subsequent scans of the same image to correct the high frequency signal. Alternatively a time averaging circuit such as a smoothing cirecuit, for example, may be employed, in which case the time averaged signal can be employed to correct the high frequency signal from the scan producing the time averaged signal. Such a circuit is shown in FIG. 1(*a*).

Detected video signal at point C is illustrated in FIG. 2(*c*). The leading edges of the detected pulses are themselves detected and employed in the generation of count pulses of uniform width and height which appear at D and are shown in FIG. 2(*d*). On integration by 22 over a similar time interval, the integrated pulses appear at F as a substantially constant signal, see FIG. 2(*f*). Alternatively a time averaging circuit may be used.

It will be appreciated that the levels of the signals at E and F are determined by the amount of detail in the image under examination. This is clearly shown by the difference in level of the two typical signals shown in FIGS. 2(*e*) and 2(*f*).

The action of the variable gain amplifier 24 is to divide the signal at E by the signal at F. When there is a large amount of fine detail and/or a large number of feature boundaries in the picture, the large high frequency component will produce a high level signal from F due to the large number of intersections of line scan with feature edges. If on the other hand there is very little fine detail or few feature edges in the picture then a lower level signal appears at E and this is divided by a correspondingly lower level signal from F. The ratio of (signal at E)/(signal at F) is found to be substantially independent of the amount of picture detail. This is illustrated in FIG. 2(*g*) by showing the output from the ratio stage 24 as being a steady signal whose amplitude is much the same for the picture on the left as on the right.

FIG. 3 illustrates an arrangement for normalising high frequency information from a video signal on a density basis and FIG. 4 illustrates various waveforms obtainable from the circuit of FIG. 3.

In FIG. 3, video signal from a source (not shown) is passed through delays 26 and 28 each delaying the signal by a small amount equivalent to a small fraction of one line scan. The video signal appearing at the three junctions A, B and C is sampled continuously by a first level detector 30 which seeks for the maximum signal amplitude of one polarity corresponding to the whitest of the three points of the image represented by junctions A, B and C and a second level detector 32 which continuously seeks for the maximum signal amplitude in the opposite sense, at the three junctions A, B and C and thereby discovers the blackest of the three points in the image corresponding to the three junctions A, B and C. The whitest level at any instant appears as an output signal from the detector 30 and the blackest level as an output from the detector 32.

In the event that a boundary between two different optical densities falls between the picture point corresponding to point A and that corresponding to point C in FIG. 3, a signal indicative of the change of density across the boundary, can be obtained by subtracting the outputs from detectors 30 and 32 and to this end a differential amplifier 34 is provided. The output from the differential amplifier 34 is supplied to reduce the gain of a variable gain amplifier 36 with increasing output from the differential amplifier 34.

An input signal for the variable gain amplifier 36 is derived from the junction of the two delays 26, 28. Information relating to feature boundaries is filtered by a high pass filter 38 which results in a short pulse at the leading and trailing edge of each video signal pulse corresponding to a feature intersection by a line scan. In order to produce similar polarity pulses both at the leading and trailing edges of video signal pulses, the output from the filter 38 is passed through a first diode 40 which allows pulses of one polarity only to pass unmodified to the junction 42. A parallel path across the diode 40 is provided containing a polarity inverting stage 44 (which otherwise leaves each pulse unmodified), and a second diode 46. The second path supplies to the junction 42 an inverted version of pulses of the opposite polarity to those which pass through diode 40.

In order to supply the information relating to feature boundaries to the variable gain amplifier 36 at the correct time, the output from the junction 42 is gated by a gate 48 which is normally closed but is opened by pulses from a standard pulse generator 50. The standard pulse generator 50 is arranged to produce a narrow pulse immediately following detection by a 50 per cent detector formed from a comparator 52 which is supplied with video signal from junction B and the output from an adding stage 54 whose two inputs are derived from the peak whitest and peak blackest signal outputs from detectors 30 and 32 respectively. A pulse is initiated by this standard pulse generator by a sudden change in the output state of the comparator 52 which indicates that the video signal at B has just passed through the 50 per cent mark on a leading or trailing video signal edge. The pulses generated by the standard pulse generator 50 are arranged to be of duration equivalent to a part of the duration of the information pulses at F.

In FIG. 4 a typical video signal is shown in graph (i) and three typical sampling points A, B and C corresponding to the junctions A, B and C in FIG. 3, are identified by arrows drawn to the video signal waveform. Assuming that the video signal corresponds to a dark feature on a light background, detector 32 will provide the signal level at A as its output and detector 30, the level at C as its output. The detected output (in the output of the comparator 52) will be as shown in FIG. 4(ii) and the two standard pulses from the standard pulse generator which result from a detection of the leading and trailing edges of the detected video signal pulse are shown in FIG. 4(iii).

Information pulses corresponding to edge information in the original video signal and appearing at junction 42 are shown in FIG. 4(iv) and, enlarged versions of these pulses are shown in FIG. 4(v). These correspond to the output of the variable gain amplifier 36 when the signal from differential amplifier 34 is greater than zero. By referring to FIG. 3 and FIG. 4 it will be seen that the amplitude of the edge information signals from the amplifier 36 will thus be substantially independent of the density variation across the edge to which they relate.

FIG. 5 illustrates a further arrangement for normalising a video signal in respect of feature obliquity to the direction of line scan. FIG. 6 illustrates typical waveforms obtainable at different points in the circuit of FIG. 5.

In FIG. 5, video signal from a source (not shown) is detected by a threshold detector 56 and detected video signal from the current line and from the preceding line, stored by a one-line delay 58, is compared in an exclusive-or logic module 60. This module produces a binary output from two inputs such that a 1-signal is produced when an input signal appears at one or other of two inputs, but a 0-signal is produced when neither or both of the input signals are present. This is illustrated in FIG. 6(i) which shows two adjacent line scans L1 and L2 intersecting a slanting feature edge 62. FIG. 6(ii) illustrates graphically a typical video waveform corresponding to the edge of the feature during the current video line L2 and FIG. 6(iii) the corresponding edge signal from the preceding line in correct time relation to that in the current line L2. FIG. 6(iv) shows the logic output signal from the exclusive-or gate 60 which appears at C in FIG. 5.

The width of the logic pulse from the gate 60 is a measure of the obliquity of the feature. If the feature edge is perpendicular to the line scan direction, the width of the pulse at C will be zero whereas if the feature edge is nearly parallel to the direction of line scan, the width of the pulse from the logic gate 60 will be very large.

A signal whose final amplitude is dependent on the pulse width is obtained by integrating the output from the logic module 60 in an integrating stage 64. The final value from the integrating stage 64 for each logic pulse from gate 60, is held in a hold circuit 66 and a feed back path 68 is provided to reset the integrator 64 after the hold circuit 66 has stored a value from the integrator 64. The hold circuit 66 provides an output signal which is supplied to a variable gain amplifier 70 to control the gain thereof and alter the transfer function to increase it from unity depending on the value of the signal stored in the hold circuit 66. Thus when 0-signal is stored, the transfer function of the variable gain amplifier 70 is unity.

An input for the variable gain amplifier 70 is derived from the original video signal by delaying the video signal in a delay device 72, passing the delayed video signal through a high pass filter 74 and obtaining similar polarity pulses corresponding to leading and trailing edges of video signals corresponding to features, by means of a first diode 76 in the path between the filter and the junction 82 and a parallel circuit path containing a polarity inverting device 78 and second diode 80. The action of the diodes 76, 80 and the inverting stage 78 is the same as for diodes 40 and 46 and inverting stage 44 contained in the circuit diagram of FIG. 3.

The delay introduced by delay device 72 is arranged to be such that the boundary information is delayed by a time interval sufficient to allow the scanning spot to scan a set length of a scan line which represents the projected length of the most oblique feature for which the circuit will correct the focus information. Thus, features whose boundaries are so close to the line scan direction that their projected length exceeds the set length, will be only partially compensated. The delay 72 may be situated before (as shown) or after the filter 74.

The output from the variable gain amplifier 70 is gated by standard pulses from a standard pulse generator 84. These are obtained by detecting leading and trailing edges of the detected video signal at junction A in FIG. 5. A further delay device 86 is introduced in the signal path between junction A and the standard pulse generator 84 so that the leading and trailing edges appear at the standard pulse generator at the correct instant in time relative to the delayed edge information appearing at junction 82 in FIG. 5. Typically the delay device 86 will have a delay value just less than delay 72. The output from the standard pulse generator 84 is supplied to a gate 88 in the output path from the variable gain amplifier 70.

Reset signals for the hold circuit 66 are derived from the standard pulses at junction J by passing the standard pulses through a high pass filter 90, rectifying these pulses to obtain a pulse corresponding to the trailing edge of the standard pulse by means of a rectifying device 92 such as a diode and then forming further standard pulses in a second standard pulse generator 94 of correct duration and amplitude to reset the hold circuit 66 to a value which gives unity transfer function for the variable gain amplifier 70.

FIG. 6(v) illustrates the ramp waveform obtained by integrating the logic output signal from the exclusive-or gate 60 and FIG. 6(vi), the stored value corresponding to the peak value of the ramp waveform of FIG. 6(v). FIG. 6(vii) illustrates the delayed edge information from the current line scan L2 and FIG. 6(viii) the edge information relating to the detected boundary at junction G in FIG. 5. FIG. 6(ix) illustrates the amplified edge information obtained by increasing the gain of the amplifier 70 for the pulse 96, thereby producing the larger amplitude of the pulse 98 of FIG. 6(ix). FIG. 6(x) illustrates the standard pulse obtained from the standard pulse generator 84; FIG. 6(xi) the detected leading and trailing edges of the standard pulse at J; FIG. 6(xii) the rectified pulse corresponding to the trailing edge only of each standard pulse at J and FIG. 6(xiii) the second standard pulse generated by the standard pulse generator 94 serving to reset the hold circuit 66. It will be seen that the leading edge of the reset pulse 100 coincides with the trailing edge of the hold signal pulse 102 of FIG. 6(vi).

FIG. 7 illustrates a system for reducing the effect of electrical noise on an automatic focusing system. To this end the filtered video signal is only supplied to the servo system in the region of fine details and feature edges. The system includes two parallel signal paths which are supplied with video signal from a common camera source 104. In the first path the signal is filtered by a high pass filter 106 and then delayed for a short time interval in a delay device 108. Conveniently this latter comprises a delay line. The second path includes a threshold detector or discriminator 110 which serves to supply a two state signal (= detected video) to an intersect count device 112. This device serves to detect the leading edges of the detected video and supply pulses of uniform height and width corresponding to each leading edge detected. The pulses from device 112 are then applied to a pulse shaping device 114 which generates pulses of duration equal to twice the delay introduced by the delay device 108. These pulses are then applied to a gate 116 in the output signal path of the delay device 108, each pulse serving to open the gate 116 for the duration of the pulse. In this way the gate 116 is opened just in advance and closed just after each fine detail or feature edge content of the delayed video signal. Since electrical noise is usually distributed evenly with respect to time, the noise content of the gated signal will be reduced as compared with the signal before gating in the ratio of the time the gate is closed to the time it is open, over any given time interval. Since the feature edge and fine detail content of an image represents perhaps only 0.01 percent of the information in a video signal, on a time basis, it will be seen that an increase of the order of 10,000:1 can be achieved in the signal to noise ratio of the signal supplied to control the focusing servo system.

FIG. 8 illustrates typical waveform obtained from the points A-G of the circuit of FIG. 7 and includes two typical features and a typical line scan intersecting them. In FIG. 8($a$) to 8($g$) the waveforms are aligned vertically with the features they refer to. In FIG. 8($a$) the video signal is shown with a high frequency noise component and FIG. 8($b$) shows that after being passed through the high pass filter 106 the noise component is still present. The delay introduced by delay state 108 is clearly shown by comparing FIG. 8($c$) with FIG. 8($b$).

The leading edges of the detected video signal pulses shown in FIG. 8($d$) are themselves detected to produce pulses as shown in FIG. 8($e$). These are employed to trigger a bistable pulse generating circuit to produce pulses of uniform height and width FIG. 8($f$) — the duration of these pulses being approximately equal to twice the delay introduced in the filtered video signal. The signal at G is shown in FIG. 8($g$) and comprises the gated portions of the filtered video. By making the gating pulses 8($f$) of appropriate duration and adjusting the delay 108 so that the peak of each high frequency burst corresponding to a fine detail or picture boundary falls substantially in the middle of a gating pulse, only the high frequency - fine detail etc., components of the video signal appear at G (together of course with any noise associated with these portions of the video signal) but the remainder of the video signal including all the noise associated therewith is prevented from reaching this point.

FIG. 9 of the drawings illustrates a combined system which normalises boundary information in a video signal first with respect to the obliquity of the boundary relative to the line scan, then with respect to the density gradient across the boundary and lastly with respect to the number of boundaries intersected during any one given period of time. The video signal is supplied to junction 118 from where it passes through two delay lines 119 and 26 which together form the delay 72 of FIG. 5 and supply delayed video signal to junction 120 in FIG. 9 which corresponds to junction F in FIG. 5 and junction B of FIG. 3. Video signal from junction 118 also passes to detector 56 corresponding to the detector 56 of FIG. 5 and to the exclusive-or gate 60 where it is compared with delayed video signal from the one line delay 58. A signal corresponding to the obliquity of the detected edge is generated in the integrating stage 64 and held in the hold circuit signal 66 as previously described with reference to FIG. 5 for application to a variable gain amplifier 70 whose input is supplied with boundary information from junction 120 (of FIG. 9) via the filter 74 and polarity correcting circuit 76, 78, 80.

From junctions 122, 120 and the output of the delayed 28, two level detectors 30, 32 are supplied with signals as described with reference to FIG. 3 and the difference beteen the whitest level and blackest levels at any given instant, is determined by the differential amplifier 34. This provides an output signal for the gain control of a further variable gain amplifier 36 whose input is supplied with the output from variable gain amplifier 70.

Normalisation with respect to the number of boundaries intercepted by the line scan raster is achieved as described with reference to FIG. 1, by integrating the output from the variable gain amplifier 36 over a long period of time (such as a frame scan period) by means of an integrator 16 and at the same time integrating over the same period of time by means of an integrator 22, the total number of interceptions with boundaries by the line scan raster. The latter signal serves as a control signal for a variable gain control amplifier 24.

Conveniently the standard pulses from the standard pulse generator 84 are employed as a measure of the number of intersections of the line scan raster with boundaries. In order to ensure that a standard pulse is generated for both leading and trailing edges of detected video, a polarity correcting circuit similar to that in the information line 124, is provided between the delay 86 and the standard pulse generator 84. This circuit comprises a diode 126 in the signal path between the delay line 86 and the standard pulse generator 84 and a polarity inverting circuit 128 and further diode 130 connected in parallel with diode 126.

It will be appreciated that gating of the output signal can be achieved at any convenient point provided that appropriate variable gain amplifiers are employed at 70, 36 and 24 of FIG. 9. However for convenience, gating is effected before the input to the variable gain amplifier 70 by means of a gate 132 supplied with the standard pulses from the standard pulse generator 184. In this way only information relating to boundaries is actually supplied to the various amplifiers and the band width of these amplifiers may therefore be reduced in consequence. It will be appreciated that the effect of gating by gate 132 is synonymous with the method of gating to reduce noise and as described with reference to FIG. 7 drawings. Hence, the signal supplied to the amplifier 70 and the subsequent amplifiers, will have a very much improved signal to noise ratio.

FIG. 10 illustrates a complete automatic focusing system employing a system for generating a normalised signal indicative of the focus of a scanned image, generally designated 132. The system 132 may comprise any of the systems illustrated in FIG. 1, FIG. 3, FIG. 5 or FIG. 9 of the drawings. In the complete system a source of video signal 10 has a focus control 134 and a perturbation signal generator 136 arranged to produce a small perturbation signal which will produce a corresponding small movement of the focus control 134. The video output from system 132 is supplied to a signal delay device 138 arranged to store the video signal from system 132 for a time equivalent to that required for the control system to respond to a small perturbation signal, so that the video signal both before and after a perturbation signal can be compared simultaneously in a comparator 140. A control stage 142 is provided which produces a first signal indicating that the high frequency content of the video signal after the perturbation signal, is greater than before and a second signal if the high frequency content of the video signal is less than before the perturbation signal. The perturbation signal generator 136 is arranged to produce signals having opposite effects on the focus control and the type of signal generated at any time is controlled by a selector 144 responsive to the signal from the control stage 142.

I claim:

1. A system for producing a normalized electrical focus control signal indicative of the focus of an image comprising means responsive to a scanned electrical video signal of the image to generate a first electrical signal whose value indicates the high frequency content of the video signal, means also responsive to said video signal to generate a second electrical signal whose value indicates the number of line scan intersections with feature boundaries of said image and signal modifying means responsive to said first and second electrical signals for modifying the value of said second electrical signal to produce said normalized electrical focus control signal, further including means for gating the signal indicative of the high frequency content of the video signal and preventing the passage thereof except in the region of feature boundaries.

2. A system for producing a normalized electrical focus control signal indicative of the focus of an image comprising means responsive to a scanned electrical video signal of the image to generate a first electrical signal whose value indicates the high frequency content of the video signal, means also responsive to said video signal to generate a second electrical signal whose value indicates the number of line scan intersections with feature boundaries of said image and signal modifying means responsive to said first and second electrical signals for modifying the value of said first electrical signal in accordance with the value of said second electrical signal to produce said normalized electrical focus control signal wherein said first electrical signal is produced by a means for summing the high frequency content of the video signal over a given time interval, and said means for generating said second electrical signal includes means responsive to said video signal for generating an electrical signal pulse corresponding to each detected feature boundary and means for summing said electrical signal pulses during said time interval to produce said second electrical signal.

3. An automatic focusing system comprising in combination with a normalising system as set forth in claim 2 means for altering the focus of an image on the photosensitive target of a scanning device producing a scanned electrical video signal corresponding to the image, circuit means for supplying the scanned electrical video signal to the normalising system, means for generating perturbation signals, circuit means for supplying a pertubation signal to the means for altering the focus to adjust the focus by an increment in one direction, means for comparing the output from the said system before and after said perturbation signal is applied and means controlling the production of further perturbation signals in response to said comparison thereby to produce a second perturbation signal producing an increment of focus adjustment in the same direction as the first perturbation signal if the first perturbation signal resulted in an increase in the level of the mormalised signal from the said system and a perturbation signal producing an increment of focus adjustment in the opposite direction to the first perturbation signal if the first perturbation signal resulted in a decrease in the level of the normalised signal from said system, and further comprising means for gating the signal indicative of the high frequency content of the video signal and preventing the passage thereof except in the region of feature boundaries.

4. A system as set forth in claim 2 further comprising a variable gain amplifier for amplifying said first electrical signal and circuit means responsive to said second electrical signal controlling the gain of said variable gain amplifier to decrease the gain thereof in response to an increase in the second signal.

5. A system as set forth in claim 2 further comprising signal integrating circuit means for effecting said signal summation and means to reset the integrating circuit means at the end of each said given time interval.

6. A system for producing a normalized electrical focus control signal indicative of the focus of an image comprising means responsive to a scanned electrical video signal of the image to generate a first electrical signal whose value indicates the high frequency content of the video signal, means also responsive to said video signal to generate a second electrical signal in exact time synchronism with said first electrical signal wherein the value of said second electrical signal indicates the value of a variable parameter associated with the feature content of the image which variable parameter affects the high frequency content of the video signal, and signal modifying means responsive to said first and second electrical signals for modifying the value of said first electrical signal in accordance with the value of said second electrical signal to produce said normalized electrical focus control signal wherein said variable parameter is the number of line scan intersections with feature boundaries and said first electrical signal is produced by a means for summing the high frequency content of the video signal over a given time interval and said second electrical signal is produced by a means for generating an electrical signal pulse corresponding to each detected feature boundary and a means for summing the electrical signal pulses during said time interval.

7. An automatic focusing system comprising in combination with a normalising system as set forth in claim 6 means for altering the focus of an image on the photosensitive target of a scanning device producing a scanned electrical video signal corresponding to the image, circuit means for supplying the scanned electrical video signal to the normalising system, means for generating perturbation signals, circuit means for supplying a perturbation signal to the means for altering the focus to adjust the focus by an increment in one direction, means for comparing the output from the said system before and after said perturbation signals in response to said comparison thereby to produce a second perturbation signal producing an increment of focus adjustment in the same direction as the first perturbation signal if the first perturbation signal resulted in an increase in the level of the normalised signal from the said system and a perturbation signal producing an increment of focus adjustment in the opposite direction to the first perturbation signal if the first perturbation signal resulted in a decrease in the level of the normalised signal from the said system, and comprising means for gating the signal indicative of the high frequency content of the video signal and presenting the passage thereof except in the region of feature boundaries.

8. A system as set forth in claim 6 further comprising a variable gain amplifier for amplifying said first electrical signal and circuit means responsive to said second electrical signal controlling the gain of said variable gain amplifier to decrease the gain thereof in response to an increase in the second signal.

9. A system as set forth in claim 6 further comprising time averaging circuit means for effecting said signal summation.

10. A system as set forth in claim 6 further comprising means for gating the signal indicative of the high frequency content of the video signal and preventing the passage thereof except in the region of feature boundaries.

11. A system for producing a normalized electrical focus signal indicative of the focus of an image comprising means responsive to a scanned electrical video signal of the image to generate a first electrical signal whose value indicates the high frequency content of the video signal, means also responsive to said video signal to generate a second electrical signal in exact time synchronism with said first electrical signal wherein the value of said second electrical signal indicates the value of a variable parameter associated with the feature content of the image which variable parameter affects the high frequency content of the video signal, and signal modifying means responsive to said first and second electrical signals for modifying the value of said first electrical signal in accordance with the value of said second electrical signal to produce said normalized electrical focus control signal, said variable parameter being the grey level difference at each feature boundary.

12. An automatic focusing system comprising in combination with a normalising system as set forth in claim 11 means for altering the focus of an image on the photosensitive target of a scanning device producing a scanned electrical video signal corresponding to the image, circuit means for supplying the scanned electrical video signal to the normalising system, means for generating perturbation signals, circuit means for supplying a perturbation signal to the means for altering the focus to adjust the focus by an increment in one direction, means for comparing the output from the said system before and after said perturbation signal is applied and means controlling the production of further perturbation signals in response to said comparison thereby to produce a second perturbation signal producing an increment of focus adjustment in the same direction as the first perturbation signal if the first perturbation signal resulted in an increase in the level of the normalised signal from the said system and a perturbation signal producing an increment of focus adjustment in the opposite direction to the first perturbation signal if the first perturbation signal resulted in a decrease in the level of the normalised signal from the said system.

13. An automatic focusing system as set forth in claim 12 further comprising means for gating the signal indicative of the high frequency content of the video signal and preventing the passage thereof except in the region of feature boundaries.

14. A system as set forth in claim 11 further comprising means for generating two electrical signals corresponding to the blackest and whitest image content over a restricted region of the image and means for generating a further signal corresponding to the difference between the said two electrical signals, said further signal constituting said second electrical signal.

15. A system as set forth in claim 14 further comprising a variable gain amplifier for amplifying the first electrical signal and circuit means responsive to said further electrical signal controlling the gain of said variable gain amplifier to decrease the gain thereof in response to an increase in said further signal.

16. A system as set forth in claim 11 further comprising means for gating the signal indicative of the high frequency content of the video signal and preventing the passage thereof except in the region of feature boundaries.

17. A system for producing a normalized electrical focus control signal indicative of the focus of an image comprising means responsive to a scanned electrical video signal of the image to generate a first electrical signal whose value indicates the high frequency content of the video signal, means also responsive to said video signal to generate a second electrical signal in exact time synchronism with said first electrical signal wherein the value of said second electrical signal indicates the value of a variable parameter associated with the feature content of the image which variable parameter affects the high frequency content of the video signal, and signal modifying means responsive to said first and second electrical signals for modifying the value of said first electrical signal in accordance with the value of said second electrical signal to produce said normalized electrical focus control signal, said variable parameter being the obliquity of each boundary to the direction of line scan.

18. A system as set forth in claim 17 further comprising means for comparing detected video signal from a current line scan with that from the previous line scan, means for generating one electrical signal whose pulse width is proportional to the time displacement of a detected boundary in the previous and current scan lines, means responsive to the said one signal to generate another signal whose pulse height is proportional to the pulse width of said one signal, means for storing a signal representative of said pulse height, means for delaying the said first electrical signal or the generation thereof by a time period corresponding to a maximum permissible time displacement of a detected boundary between two adjacent scan lines, variable gain amplifier means for amplifying delayed first electrical signal, circuit means for controlling the gain of said variable gain amplifier and means for supplying thereto the stored signal corresponding to the pulse height thereby to increase the gain of the variable gain amplifier in proportion to the pulse height of the stored signal.

19. A system as set forth in claim 17 further comprising means for gating the signal indicative of the high frequency content of the video signal and preventing the passage thereof except in the region of feature boundaries.

20. An automatic focusing system comprising in combination with a normalising system as set forth in claim 17 means for altering the focus of an image on the photosensitive target of a scanning device producing a scanned electrical video signal corresponding to the image, circuit means for supplying the scanned electrical video signal to the normalising system, means for generating perturbation signals, circuit means for supplying a perturbation signal to the means for altering the focus to adjust the focus by an increment in one direction, means for comparing the output from the said system before and after said perturbation signal is applied and means controlling the production of further perturbation signals in response to said comparison thereby to produce a second perturbation signal producing an increment of focus adjustment in the same direction as the first perturbation signal if the first perturbation signal resulted in an increase in the level of the normalised signal from the said system and a perturbation signal producing an increment of focus adjustment in the opposite direction to the first perturbation signal if the first perturbation signal resulted in a decrease in the level of the normalised signal from the said system.

21. An automatic focusing system as set forth in claim 20 further comprising means for gating the signal indicative of the high frequency content of the video signal and preventing the passage thereof except in the region of feature boundaries.

* * * * *